(12) United States Patent
Akazaki

(10) Patent No.: US 11,126,101 B2
(45) Date of Patent: Sep. 21, 2021

(54) YELLOW TONER

(71) Applicant: ZEON CORPORATION, Tokyo (JP)

(72) Inventor: Kojiro Akazaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/957,131

(22) PCT Filed: Dec. 21, 2018

(86) PCT No.: PCT/JP2018/047339
§ 371 (c)(1),
(2) Date: Jun. 23, 2020

(87) PCT Pub. No.: WO2019/131543
PCT Pub. Date: Jul. 4, 2019

(65) Prior Publication Data
US 2020/0348610 A1   Nov. 5, 2020

(30) Foreign Application Priority Data
Dec. 27, 2017 (JP) .............................. JP2017-252282

(51) Int. Cl.
*G03G 9/09* (2006.01)
*C09B 23/14* (2006.01)
*C09B 29/33* (2006.01)
*C09B 33/147* (2006.01)
*C09B 67/22* (2006.01)
*G03G 9/093* (2006.01)

(52) U.S. Cl.
CPC .......... *G03G 9/091* (2013.01); *C09B 23/143* (2013.01); *C09B 29/337* (2013.01); *C09B 33/147* (2013.01); *C09B 67/0046* (2013.01); *G03G 9/09321* (2013.01); *G03G 9/09364* (2013.01)

(58) Field of Classification Search
CPC .................................................... G03G 9/091
See application file for complete search history.

(56) References Cited

U.S. PATENT DOCUMENTS

| 6,187,495 | B1 | 2/2001 | Chiba et al. |
| 2003/0207186 | A1 | 11/2003 | Itakura et al. |
| 2017/0218203 | A1* | 8/2017 | Harada ................ C09D 11/037 |

FOREIGN PATENT DOCUMENTS

| JP | 2000-162824 A | 6/2000 |
| JP | 2003-280278 A | 10/2003 |
| JP | 2006-126384 A | 5/2006 |

OTHER PUBLICATIONS

Notification of Transmittal of Translation of the International Preliminary Report on Patentabililty (Form PCT/IB/338) issued in counterpart International Application No. PCT/JP2018/047339 dated Jul. 9, 2020 with Forms PCT/IB/373 and PCT/ISA/237. (6 pages).

* cited by examiner

*Primary Examiner* — Peter L Vajda
(74) *Attorney, Agent, or Firm* — Westerman, Hattori, Daniels & Adrian, LLP

(57) ABSTRACT

A yellow toner which provides, even in small amounts, a sharper color and brighter gloss, and higher reflection density than ever before, and which has excellent light resistance. The yellow toner contains a binder resin and a yellow colorant, wherein, as the yellow colorant, at least one of the compound A represented by the following general formula (1) and the compound B represented by the following general formula (2), and the compound C represented by the following formula (3) are contained:

General Formula (1)

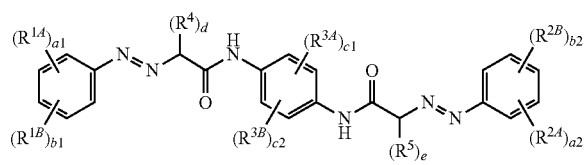

General Formula (2)

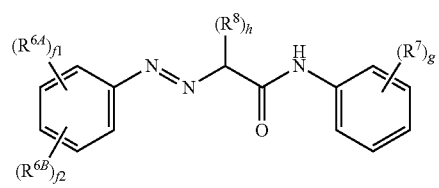

Formula (3)

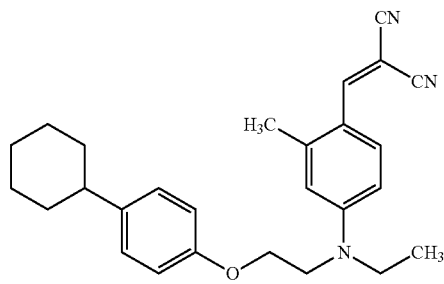

4 Claims, No Drawings

YELLOW TONER

TECHNICAL FIELD

The present disclosure relates to a yellow toner which provides, even in small amounts, a sharper color and brighter gloss, and higher reflection density, and which has more excellent light resistance than ever before.

BACKGROUND ART

In image forming devices such as an electrophotographic device and an electrostatic recording device, an electrostatic latent image to be formed on a photo conductor is first developed with a toner. Subsequently, a formed toner image is transferred onto a transfer material such as paper if required, and then fixed by various methods such as heating, pressurization or solvent vapor.

In such image forming devices, digital full color copying machines and digital full color printers have been put to practical use. In digital full color copying machines, a color image original is color-separated by each of color filters of blue, green and red, and then electrostatic latent images having a dot diameter of from 20 μm to 70 μm corresponding to the color original are developed using each of toners of yellow, magenta, cyan and black, and a full color image is formed utilizing an action of subtractive color mixing.

In recent years, a demand for higher image quality and higher definition of the full color image has been increasing. In particular, in order to improve color reproducibility, it is desired that printing can be performed with the same hue as printing with ink.

As a color pigment for a yellow toner, for example, a disazo pigment as typified by C.I. Pigment Yellow 12, 13 and 17, and a monoazo pigment as typified by C.I. Pigment Yellow 97 and 98 have been generally used.

Patent Literature 1 discloses a yellow toner comprising a combination of, as yellow colorants, C.I. Pigment Yellow 155 (disazo pigment) with C.I. Pigment Yellow 110 or the like at a specific ratio. In Patent Literature 1, it is described that by using such colorants, an excellent resistance to hot offset can be obtained even when using heat-and-pressure fixing means in which any oil is not used or such an oil is used in a small quantity; both long-term shelf stability in a high-temperature environment and low-temperature fixing performance can be achieved; and color tones of process inks (color reproduction ranges) can be covered.

Besides the combinations of yellow pigments, examples of improving toner properties by a combination of a yellow pigment and a yellow dye, are known.

Patent Literature 2 discloses a yellow toner comprising a condensed azo pigment such as C.I. Pigment Yellow 93, and C.I. Solvent Yellow 162. In Patent Literature 2, it is described that the aggregation of the condensed azo pigment such as C.I. Pigment Yellow 93 can be suppressed by the use of C.I. Solvent Yellow 162, so that the dispersibility of the condensed azo pigment can be increased, and more uniform triboelectric chargeability can be obtained.

Patent Literature 3 discloses a yellow toner comprising C.I. Pigment Yellow 74 and C.I. Solvent Yellow 162. In Patent Literature 3, it is described that by containing these colorants, the toner obtains satisfactory color tone that is obtained in the case of incorporating C.I. Pigment Yellow 74 solely in a toner, and high coloring power of C.I. Solvent Yellow 162.

CITATION LIST

Patent Literature

Patent Literature 1: Japanese Patent Application Laid-Open (JP-A) No. 2003-280278
Patent Literature 2: JP-A No. 2000-162824
Patent Literature 3: JP-A No. 2006-126384

SUMMARY OF INVENTION

Technical Problem

The applications of an electrophotographic image forming device have been extended from general copying machines and printers used to print or simply copy office documents, to a field of production of printed matters for use outside the office, specifically, to the print-on-demand (POD) market that is an area of quick printing, since the image forming device can easily print variable information from electronic data. Therefore, in recent years, the level of demand required of the chroma, gloss and reflection density of a printed product has been rapidly increased.

However, due to the following reasons, it cannot be said that the yellow toners disclosed in Patent Literatures 1 to 3 are applicable to the various applications mentioned above.

First, the combination of the colorants disclosed in Patent Literature 1 (C.I. Pigment Yellow 155 and C.I. Pigment Yellow 110 or the like) has a problem of low reflection density of the yellow toner, since the two pigments have low coloring power. This combination has another problem in that the color is dull since the colorants have a large difference in hue.

Unlike a pigment, a dye is characterized by solubility in solvents and poor resistance to light. Accordingly, a combination of a dye and a pigment has a problem of a decrease in light resistance of a toner, depending on types of the dye and the pigment which are combined. The combination of the colorants disclosed in Patent Literature 2 (C.I. Pigment Yellow 93 or the like and C.I. Solvent Yellow 162) and the combination of the colorants disclosed in Patent Literature 3 (C.I. Pigment Yellow 74 and C.I. Solvent Yellow 162) cannot solve the problem of the decrease in light resistance.

Furthermore, there is a common general knowledge that, when a combination of a pigment and a dye is used, the dye plays a role of making up for a disadvantage of the pigment (for example, a role of supporting a dispersion state of the pigment etc.). Therefore, in a toner of prior art, in which a combination of a pigment and a dye is used, it has not been known that a dye itself improves e.g. gloss as a coloring property of a toner.

From the viewpoint of downsized image forming devices and less energy consumption, there is a demand for reduction in toner consumption in printing. However, printing with a small amount of toner has a problem in that there is a decrease in chroma and color gamut. Also, the toners described in Patent Literatures 1 to 3 cannot obtain a sufficiently wide color gamut when the toner amount is small.

For a chroma of a printed product, gloss and reflection density, the level of demand has been rapidly increased in recent years, in order to be applicable to the wide range of applications. To meet such a high level of demand, an object of the present disclosure is to provide a yellow toner which provides, in small amounts, a sharper color and brighter gloss, and higher reflection density, and which has more excellent light resistance, than ever before.

To attain the object, the inventor of the present disclosure conducted detailed research and found that the yellow toner that shows, even in small amounts, higher gloss, reflection density and chroma, and which has more excellent light resistance, than ever before, is obtained by using the combination of compounds as a yellow colorant, each of which has a specific chemical structure. Based on this finding, the inventor achieved the present disclosure.

Solution to Problem

The yellow toner of the present disclosure is a yellow toner comprising a binder resin and a yellow colorant, wherein, as the yellow colorant, at least one of the compound A represented by the following general formula (1) and the compound B represented by the following general formula (2), and the compound C represented by the following formula (3) are contained:

General Formula (1)

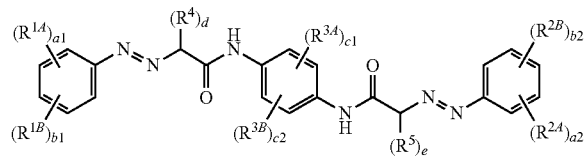

where $R^{1A}$, $R^{1B}$, $R^{2A}$ and $R^{2B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr); $R^{3A}$ and $R^{3B}$ are each independently a halogen atom or an alkyl group; $R^4$ and $R^5$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$); a1 and b1 are non-negative integers that a sum of the non-negative integers a1 and b1 is 1 or more and 3 or less; a2 and b2 are non-negative integers that a sum of the non-negative integers a2 and b2 is 1 or more and 3 or less; c1 and c2 are non-negative integers that a sum of the non-negative integers c1 and c2 is 0 or more and 3 or less; d and e are each independently 1 or 2; Ar is an aryl group having 6 to 10 carbon atoms, which may have a substituent.

General Formula (2)

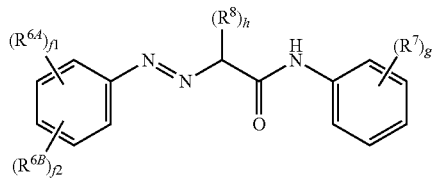

where $R^{6A}$ and $R^{6B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr); $R^7$ and $R^8$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$); f1 and f2 are non-negative integers that a sum of the non-negative integers f1 and f2 is 1 or more and 3 or less; g is an integer of 0 or more and 3 or less; h is 1 or 2; Ar is an aryl group having 6 to 10 carbon atoms, which may have a substituent.

Formula (3)

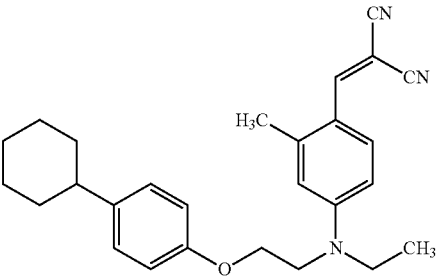

In the present disclosure, the compound A and the compound B may be each a yellow pigment, and the compound C may be a yellow dye.

In the present disclosure, a total content of the compound A and the compound B may be from 1 part by mass to 15 parts by mass, and a content of the compound C may be from 0.1 parts by mass to 8.0 parts by mass, with respect to 100 parts by mass of the binder resin.

In the present disclosure, a mass ratio of a total content of the compound A and the compound B to a content of the compound C ((compound A+compound B)/compound C) may be from 0.1 to 10.

Advantageous Effects of Invention

According to the present disclosure as described above, a yellow toner which shows, even in small amounts, higher gloss, reflection density and chroma than ever before, and which has excellent light resistance can be provided by using at least one of the compound A and the compound B in combination with the compound C.

DESCRIPTION OF EMBODIMENTS

The yellow toner of the present disclosure is a yellow toner comprising a binder resin and a yellow colorant, wherein, as the yellow colorant, at least one of the compound A represented by the following general formula (1) and the compound B represented by the following general formula (2), and the compound C represented by the following formula (3) are contained:

General Formula (1)

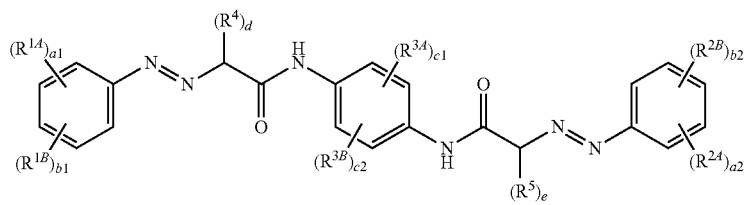

where $R^{1A}$, $R^{1B}$, $R^{2A}$ and $R^{2B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr); $R^{3A}$ and $R^{3B}$ are each independently a halogen atom or an alkyl group; $R^4$ and $R^5$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$); a1 and b1 are non-negative integers that a sum of the non-negative integers a1 and b1 is 1 or more and 3 or less; a2 and b2 are non-negative integers that a sum of the non-negative integers a2 and b2 is 1 or more and 3 or less; c1 and c2 are non-negative integers that a sum of the non-negative integers c1 and c2 is 0 or more and 3 or less; d and e are each independently 1 or 2; Ar is an aryl group having 6 to 10 carbon atoms, which may have a substituent.

General Formula (2)

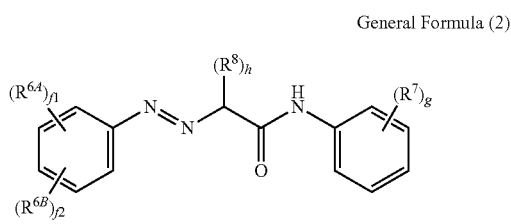

where $R^{6A}$ and $R^{6B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr); $R^7$ and $R^8$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$); f1 and f2 are non-negative integers that a sum of the non-negative integers f1 and f2 is 1 or more and 3 or less; g is an integer of 0 or more and 3 or less; h is 1 or 2; Ar is an aryl group having 6 to 10 carbon atoms, which may have a substituent.

Formula (3)

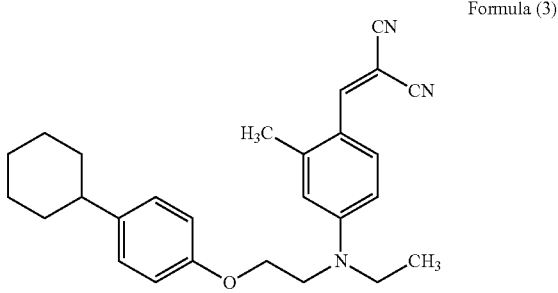 [SMILES: CCN(CCOc1ccc(C2CCCCC2)cc1)c1ccc(C=C(C#N)C#N)c(C)c1]

Hereinafter, the yellow toner of the present disclosure may be simply referred to as "toner".

Hereinafter, a method for producing yellow colored resin particles (Hereinafter, it may be simply referred to as "colored resin particles".) used preferably in the present disclosure, the yellow colored resin particles obtained by the production method, a method for producing a toner using the yellow colored resin particles, and the yellow toner of the present disclosure will be described in this order.

1. Method for Producing Colored Resin Particles

Generally, methods for producing the colored resin particles are broadly classified into dry methods such as a pulverization method and wet methods such as an emulsion polymerization agglomeration method, a suspension polymerization method and a solution suspension method. The wet methods are preferable since toners having excellent printing characteristics such as image reproducibility can be easily obtained. Among the wet methods, polymerization methods such as the emulsion polymerization agglomeration method and the suspension polymerization method are preferable since toners which have relatively small particle size distribution in micron order can be easily obtained. Among the polymerization methods, the suspension polymerization method is more preferable.

The emulsion polymerization agglomeration method is a method for producing colored resin particles by polymerizing emulsified polymerizable monomers to obtain a resin microparticle emulsion, and aggregating the resultant resin microparticles with a colorant dispersion, etc. The solution suspension method is a method for producing colored resin particles by forming droplets of a solution in an aqueous medium, the solution containing toner components such as a binder resin and a colorant dissolved or dispersed in an organic solvent, and removing the organic solvent. Both methods can be performed by known methods.

The colored resin particles to be used in the present disclosure can be produced by employing the wet methods or the dry methods. The wet methods are preferable, and the suspension polymerization method is especially preferable among the wet methods. When the suspension polymerization method is employed, the colored resin particles may be produced by the following processes.
(A) Suspension Polymerization Method
(A-1) Preparation Process of Polymerizable Monomer Composition First, a polymerizable monomer, a yellow colorant, and other additives added as needed, such as a charge control agent and a release agent, are mixed to prepare a polymerizable monomer composition. For example, a media type dispersing machine is used for the mixing in preparation of the polymerizable monomer composition.

In the present disclosure, the polymerizable monomer means a monomer having a polymerizable functional group, and the polymerizable monomer is polymerizable to be a binder resin. It is preferable to use a monovinyl monomer as a main component of the polymerizable monomer. Examples of the monovinyl monomer include styrene; styrene derivatives such as vinyltoluene and α-methylstyrene; acrylic acid and methacrylic acid; acrylic acid esters such as methyl acrylate, ethyl acrylate, propyl acrylate, butyl acrylate, 2-ethylhexyl acrylate and dimethylaminoethyl acrylate; methacrylic acid esters such as methyl methacrylate, ethyl methacrylate, propyl methacrylate, butyl methacrylate, 2-ethylhexyl methacrylate and dimethylaminoethyl methacrylate; nitryl compounds such as acrylonitrile and methacrylonitrile; amide compounds such as acrylamide and methacrylamide; and olefins such as ethylene, propylene and butylene. These monovinyl monomers may be used alone or in combination of two or more kinds. Among them, it is preferable to use styrene, styrene derivative, derivative of acrylic acid or methacrylic acid as a monovinyl monomer.

In order to improve the hot offset and shelf stability, it is preferable to use any crosslinkable polymerizable monomer together with the monovinyl monomer. The crosslinkable polymerizable monomer means a monomer having two or more polymerizable functional groups. Examples of the crosslinkable polymerizable monomer include: aromatic divinyl compounds such as divinyl benzene, divinyl naphthalene and derivatives thereof; ester compounds such as ethylene glycol dimethacrylate and diethylene glycol dimethacrylate, in which two or more carboxylic acids are esterified to alcohol having two or more hydroxyl groups; other divinyl compounds such as N,N-divinylaniline and divinyl ether; and compounds having three or more vinyl groups. These crosslinkable polymerizable monomers can be used alone or in combination of two or more kinds.

In the present disclosure, it is desirable that a content of the crosslinkable polymerizable monomer to be used is generally from 0.1 to 5 parts by mass, preferably from 0.3 to 2 parts by mass, with respect to 100 parts by mass of the monovinyl monomer.

Also, it is preferable to use a macromonomer as a part of the polymerizable monomer, since the balance between the shelf stability and low-temperature fixability of the toner thus obtained can be excellent. The macromonomer has a polymerizable carbon-carbon unsaturated double bond at the end of the molecular chain and is a reactive oligomer or polymer which usually has a number average molecular weight of from 1,000 to 30,000. The macromonomer is preferably one that can provide a polymer having a higher glass transition temperature (hereinafter may be referred to as "Tg") than a polymer obtained by polymerizing the monovinyl monomer. The macromonomer to be used is preferably in the range from 0.03 to 5 parts by mass, more preferably from 0.05 to 1 part by mass, with respect to 100 parts by mass of the monovinyl monomer.

In the present disclosure, the yellow colorant contains at least one of the compound A and the compound B, and the compound C.

The compound A of the present disclosure is a disazo compound represented by the following general formula (1):

General Formula (1)

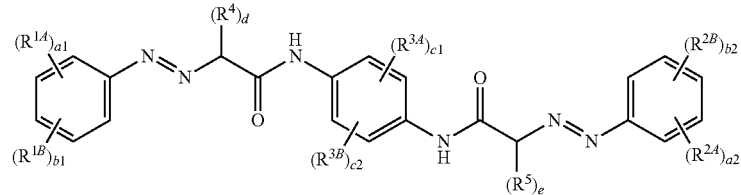

In the general formula (1), $R^{1A}$, $R^{1B}$, $R^{2A}$ and $R^{2B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr). Ar herein refers an aryl group having 6 to 10 carbon atoms, which may have a substituent. Preferably, $R^{1A}$, $R^{1B}$, $R^{2A}$ and $R^{2B}$ are each independently a chlorine atom, a methyl group, a methoxy group, an amino group, a nitro group, an acetylamide group, a methyl ester group, a primary amide group or an arylamide group. More preferably, $R^{1A}$ and $R^{2A}$ are each a chlorine atom, a methyl group or a methyl ester group, and $R^{1B}$ and $R^{2B}$ are each a methyl ester group, a primary amide group or an arylamide group. An arylamide group is preferably a phenyl group or a naphtyl group which may have an substituent, more preferably a phenyl group in which one or more hydrogen atoms are each substituted with one of a halogen atom and an alkyl group, further preferably a phenyl group in which a hydrogen atom is substituted with a chlorine atom and another hydrogen atom is substituted with a methyl group respectively.

Each of $R^{1A}$, $R^{1B}$, $R^{2A}$ and $R^{2B}$ may have a bond with any carbon atom on the benzene ring (except the carbon atom bound to the azo group (—N═N—)). $R^{1A}$ and $R^{2A}$ preferably have a bond with the carbon atom at the ortho-position to the carbon atom on the benzene ring bound to the azo group (—N═N—). $R^{1B}$ and $R^{2B}$ preferably have a bond with the carbon atom at the meta-position to the carbon atom on the benzene ring bound to the azo group (—N═N—).

In the general formula (1), a1 and b1 are non-negative integers that a sum of the non-negative integers a1 and b1 is 1 or more and 3 or less, and a2 and b2 are non-negative integers that a sum of the non-negative integers a2 and b2 is 1 or more and 3 or less. It is preferable that a1, b1, a2 and b2 are each 1.

In the general formula (1), $R^{3A}$ and $R^{3B}$ are each independently a halogen atom or an alkyl group. $R^{3A}$ and $R^{3B}$ may be each independently a chlorine atom or a methyl group.

$R^{3A}$ and $R^{3B}$ may have a bond with any carbon atom on the benzene ring (except the carbon atoms bound to the amide groups (—CO—NH—)).

In the general formula (1), c1 and c2 are non-negative integers that a sum of the non-negative integers c1 and c2 is 0 or more and 3 or less. The case in which the sum of the non-negative integers c1 and c2 is 0 means that both c1 and c2 are 0, that is, substituent $R^{3A}$ and $R^{3B}$ are not present. c1 and c2 may be each independently 0 or 1.

In the general formula (1), $R^4$ and $R^5$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$). $R^4$ and $R^5$ are each preferably an acetyl group or a methyl ester group.

In the general formula (1), d and e are each independently 1 or 2. It is preferable that d and e are each 1.

As the compound A, examples include the following compounds. The compound represented by the formula (1A) is C.I. Pigment Yellow 155 (CAS No. 68516-73-4, hue angle: 95°). The compound represented by the formula (1B) is C.I. Pigment Yellow 214 (CAS No. 254430-12-5, hue angle: 97°). The compound represented by the formula (1C) is C.I. Pigment Yellow 93 (CAS No. 5580-57-4, hue angle: 95°). The compound represented by the formula (1D) is C.I. Pigment Yellow 219 (CAS No. 347174-87-2, hue angle: 96°).

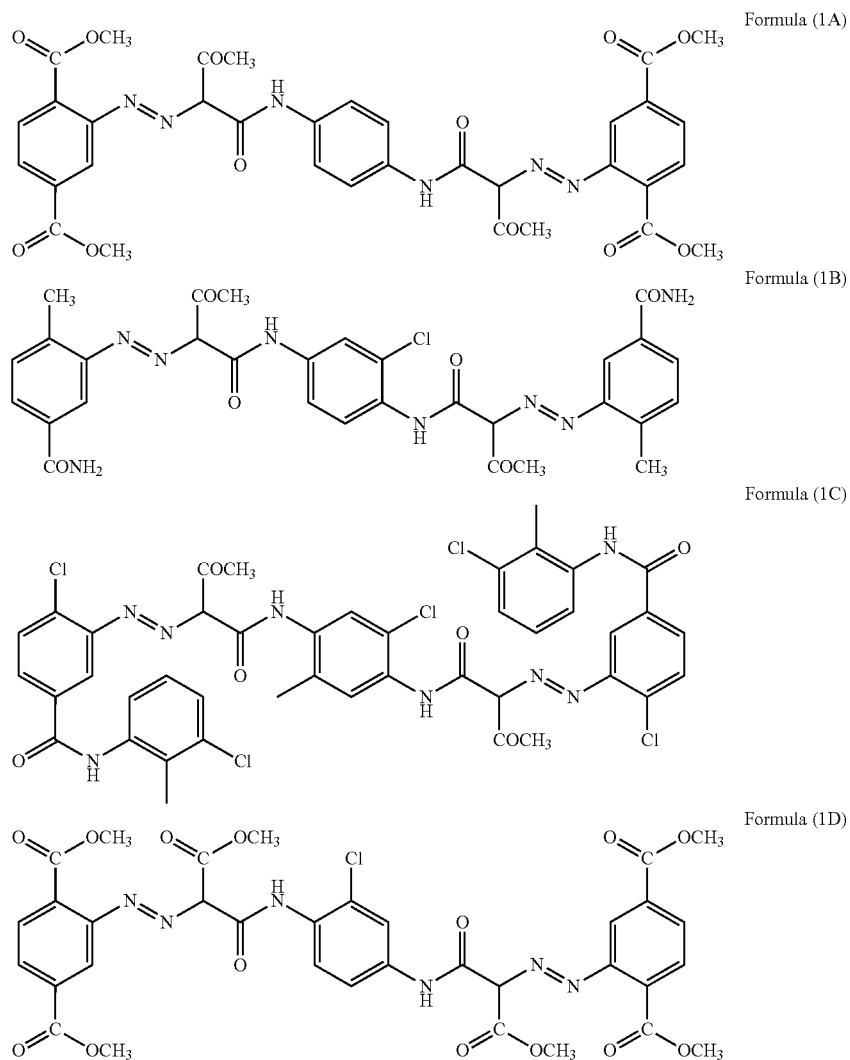

Formula (1A)

Formula (1B)

Formula (1C)

Formula (1D)

The compound A is not limited to the above compounds represented by the formulae (1A) to (1D). Also, tautomers of the above compounds represented by the formulae (1A) to (1D) can be preferably used as the compound A.

As the compound A, a commercially available product can be used, or a compound synthesized in advance can be used.

As the method for synthesizing the compound A, examples include, but are not limited to, a method of coupling one equivalent of an N,N'-1,4-diacetylphenylenediamine derivative represented by the following general formula (a) with two equivalents of a benzenediazonium derivative represented by the following general formula (b) (see Japanese Examined Patent Publication No. 48-13692).

General Formula (a)

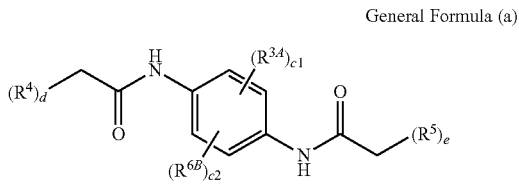

where $R^{3A}$, $R^{3B}$, $R^4$ and $R^5$ in the general formula (a) are the same groups as $R^{3A}$, $R^{3B}$, $R^4$ or $R^5$ in the general formula (1), respectively, and c1, c2, d and e in the general formula (a) are the same numbers as c1, c2, d or e in the general formula (1), respectively.

General Formula (b)

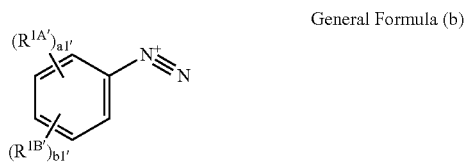

where $R^{1A'}$ in the general formula (b) is the same group as $R^{1A}$ or $R^{2A}$ in the general formula (1), and $R^{1B'}$ in the general formula (b) is the same group as $R^{1B}$ or $R^{2B}$ in the general formula (1). a1' in the general formula (b) is the same number as a1 or a2 in the general formula (1), b1' in the general formula (b) is the same number as b1 or b2 in the general formula (1).

The compound B of the present disclosure is a monoazo compound represented by the following general formula (2):

General Formula (2)

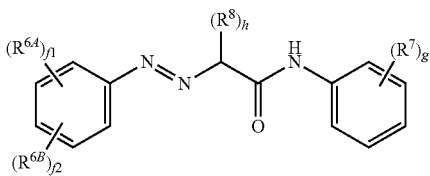

where $R^{6A}$ and $R^{6B}$ are each independently a halogen atom, an alkyl group, an alkoxy group, an amino group, a nitro group, an acetylamide group (—NHCOCH$_3$), a methyl ester group (—COOCH$_3$), a primary amide group (—CONH$_2$) or an arylamide group (—CONHAr). Ar herein refers an aryl group having 6 to 10 carbon atoms, which may have a substituent. Preferably, $R^{6A}$ and $R^{6B}$ are each independently a chlorine atom, a methyl group, a methoxy group, an amino group, a nitro group, an acetylamide group, a methyl ester group, a primary amide group or an arylamide group. More preferably, $R^{6A}$ is a methyl group, a methoxy group or a methyl ester group, and $R^{6B}$ is a nitro group or a primary amide group.

Each of $R^{6A}$ and $R^{6B}$ may have a bond with any carbon atom on the benzene ring (except the carbon atom bound to the azo group (—N=N—)). $R^{6A}$ preferably has a bond with the carbon atom at the ortho-position to the carbon atom on the benzene ring bound to the azo group (—N=N—). $R^{6B}$ preferably has a bond with the carbon atom at the para-position to the carbon atom on the benzene ring bound to the azo group (—N=N—).

In the general formula (2), f1 and f2 are non-negative integers that a sum of the non-negative integers f1 and f2 is 1 or more and 3 or less. Preferably, f1 and f2 are each 1.

In the general formula (2), $R^7$ and $R^8$ are each independently a halogen atom, an alkyl group, a methoxy group, an amino group, a nitro group, an acetylamide group (—NHCOCH$_3$), an acetyl group (—COCH$_3$), a methyl ester group (—COOCH$_3$) or a primary amide group (—CONH$_2$).

$R^7$ may be a halogen atom or an alkyl group, and $R^7$ may be a chlorine atom or a methyl group. $R^7$ may have a bond with any carbon atom on the benzene ring (except the carbon atoms bound to the amide groups (—CO—NH—)).

$R^8$ may be an acetyl group.

In the general formula (2), g is an integer of 0 or more and 3 or less. The case in which the integer g is 0 means that the substituent $R^7$ is not present.

In the general formula (2), h is 1 or 2. Preferably, h is 1.

The compound B may be a commercially-available product or may be synthesized in advance.

As the method for synthesizing the compound B examples include, but are not limited to, a method of coupling 1 equivalent of an N-acetylaniline derivative represented by the following general formula (c) with 1 equivalent of a benzenediazonium derivative represented by the following general formula (d).

General Formula (c)

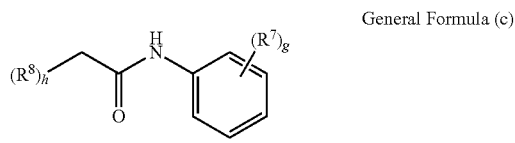

where $R^7$ and $R^8$ in the general formula (c) are the same groups as $R^7$ or $R^8$ in the general formula (2), respectively, and g and h in the general formula (c) are the same numbers as g or h in the general formula (2), respectively.

General Formula (d)

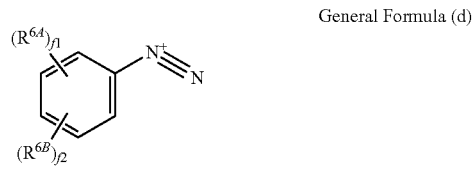

where $R^{6A}$ and $R^{6B}$ in the general formula (d) are the same groups as $R^{6A}$ or $R^{6B}$ in the general formula (2), respectively. f1 and f2 in the general formula (d) are the same numbers as f1 or f2 in the general formula (2), respectively.

As the compound B, examples include, but are not limited to, the following compounds. The compound represented by the formula (2A) is C.I. Pigment Yellow 74 (represented by the following formula (2A) CAS No. 6,358-31-2, hue angle: 93° to 91°)

Formula (2A)

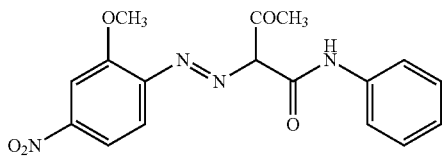

The compound B is not limited to the compound represented by the formula (2A). As the compound B, other compounds such as C.I. Pigment Yellow 73, C.I. Pigment Yellow 75 and the like can be used. Also, tautomers of the compound represented by the formula (2A) can be preferably used as the compound B.

The compound A and the compound B may be each a yellow pigment. The light resistance of the yellow toner of the present disclosure can be improved by using the yellow pigment in combination with the yellow dye (the compound C) described later.

A total content of the compound A and the compound B is preferably from 1 to 15 parts by mass, more preferably from 3 to 13 parts by mass, further preferably from 5 to 12 parts by mass, and further more preferably from 8 to 10 parts by mass, with respect to 100 parts by mass of the binder resin. When the total content of the compound A and the compound B is in the above range, the reflection density, chroma, gloss, light resistance and coloring power of the toner are improved, and an image with sharp color tone and excellent transparency can be obtained. When either the compound A or the compound B is used, "a total content of the compound A and the compound B" means the content of the compound that is used.

In the present disclosure, besides the compound A and/or the compound B, the compound C (C.I. Solvent Yellow 179, CAS No. 54079-53-7, hue angle: 100°) represented by the following formula (3) is contained as the yellow colorant.

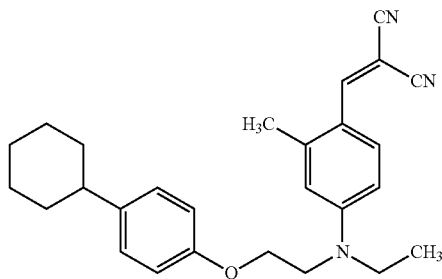

Formula (3)

Even though the compound C is a yellow dye, by using the compound A and/or the compound B in combination with the compound C, it improves especially the gloss of the yellow toner, and increases the reflection density of the yellow toner, even in small amounts of the toner. It can be said an unexpected effect compared to a prior art that a yellow dye itself improves a coloring property of a toner by using the yellow dye in combination with other colorant (a yellow pigment etc.).

A content of the compound C is preferably from 0.1 to 8.0 parts by mass, more preferably from 0.5 to 7.0 parts by mass, further preferably from 1.0 to 6.0 parts by mass, with respect to 100 parts by mass of the binder resin. When the content of the compound C is in the above range, reflection density, chroma, gloss, light resistance and coloring power of the toner are improved, and an image with sharp color tone and excellent transparency can be obtained.

In the present disclosure, a mass ratio of a total content of the compound A and the compound B to a content of the compound C ((compound A+compound B)/compound C) is preferably from 0.1 to 10, more preferably from 0.7 to 7.0, further preferably from 1.7 to 6.0, further more preferably from 2.0 to 5.0. When the mass ratio is in the above range, reflection density, chroma, gloss, light resistance and coloring power of the toner are improved, and an image with sharp color tone and excellent transparency can be obtained.

A total content of the compound A, the compound B and the compound C is preferably from 1.0 to 23 parts by mass, more preferably from 5 to 16 parts by mass, further preferably from 8 to 13 parts by mass, with respect to 100 parts by mass of the binder resin.

When the total content of the compound A, the compound B and the compound C is in the above range, chroma and yellow coloring properties of the toner are more improved, and dispersibility of the compound A in a toner is more improved. When either the compound A or the compound B is used in combination with the compound C, "a total content of the compound A, the compound B and the compound C" means a sum of a content of either the compound A or the compound B and a content of the compound C.

The principle of the effect by using the compound A and/or the compound B in combination with the compound C is not clear. However, by using the combination of these compounds, the dispersion stability of the compound C in a polymerizable monomer composition or in a binder resin improves by the presence of the compound A and/or the compound B, each of which has a specific chemical structure. Consequently, it is assumed that the toner shows higher chroma and gloss, and higher reflection density than ever before, and has more excellent light resistance than ever before even in small amounts. Advantages of both of a pigment and a dye are exhibited, especially when the compound A and/or the compound B are each a yellow pigment, and the compound C is a yellow dye.

In order to improve the charging ability of the toner, a charge control agent having positively charging ability or negatively charging ability can be used as another additive.

The charge control agent is not particularly limited, as long as it is one that is generally used as a charge control agent for toners. Of charge control agents, a positively- or negatively-chargeable charge control resin is preferred, since it can improve the dispersibility of the compound A and the compound B of the present disclosure, and it has high compatibility with polymerizable monomers and can impart stable charge property (charge stability) to the toner particles. From the viewpoint of obtaining a positively-chargeable toner, a positively-chargeable charge control resin is more preferably used.

As the positively chargeable charge control agent, examples include, but are not limited to, a nigrosine dye, a quaternary ammonium salt, a triaminotriphenylmethane compound and an imidazole compound, and as charge control resin preferably used as the positively chargeable charge control agent, a polyamine resin, a quaternary ammonium group-containing copolymer and a quaternary ammonium salt group-containing copolymer.

As the negatively chargeable charge control agent, examples include, but are not limited to, an azo dye containing a metal such as Cr, Co, Al and Fe; a metal salicylate compound; a metal alkylsalicylate compound; and as charge control resin preferably used as the negatively chargeable charge control agent, a sulfonic acid group-containing copolymer, a sulfonic acid salt group-containing copolymer, a carboxylic acid group-containing copolymer and a carboxylic acid salt group-containing copolymer.

In the present disclosure, the charge control agent is used in an amount of, generally from 0.01 to 10 parts by mass, preferably from 0.03 to 8 parts by mass, with respect to 100 parts by mass of the monovinyl monomer. When the added amount of the charge control agent is from 0.01 to 10 parts by mass, fog and printing soiling are not likely to occur.

In addition, it is preferable to use a molecular weight modifier as the other additives, when the polymerizable monomer which becomes a binder resin is polymerized.

The molecular weight modifier is not particularly limited, as long as it is one that is generally used as a molecular weight modifier for toners. As the molecular weight modifier, examples include, but are not limited to, mercaptans such as t-dodecyl mercaptan, n-dodecyl mercaptan, n-octyl mercaptan and 2,2,4,6,6-pentamethylheptane-4-thiol; and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide. These molecular weight modifiers may be used alone or in combination of two or more kinds.

In the present disclosure, the molecular weight modifier is used in an amount of, generally from 0.01 to 10 parts by mass, preferably from 0.1 to 5 parts by mass, with respect to 100 parts by mass of the monovinyl monomer.

As another additive, it is preferable to add a release agent. By adding the release agent, the releasability of the toner from a fixing roller upon fixing, can be improved. The release agent is not particularly limited, as long as it is one that is generally used as a release agent for toners. As the release agent, examples include, but are not limited to, low-molecular-weight polyolefin waxes and modified waxes thereof; petroleum waxes such as paraffin; mineral waxes such as ozokerite; synthetic waxes such as Fischer-Tropsch wax; and ester waxes such as dipentaerythritol ester and carnauba. Since the toner can achieve a balance between shelf stability and low-temperature fixability, ester waxes are preferred, and a synthetic ester wax obtained by esterifying alcohol and carboxylic acid is more preferred. Among them, a synthetic ester wax obtained by esterifying polyalcohol and monocarboxylic acid is further preferred. These release agents may be used alone or in combination of two or more kinds.

The release agent is used in an amount of preferably from 1 to 30 parts by mass, more preferably from 5 to 20 parts by mass, with respect to 100 parts by mass of the monovinyl monomer.

(A-2) Suspension Process to Obtain Suspension (Droplets Forming Process)

In the present disclosure, the polymerizable monomer composition containing the polymerizable monomer and the yellow colorant is dispersed in an aqueous medium containing a dispersion stabilizer, and a polymerization initiator is added therein. Then, the polymerizable monomer composition are formed into droplets. The method for forming the droplets is not particularly limited. For example, the droplets are formed by means of a device capable of strong stirring, such as an (in-line type) emulsifying and dispersing machine (product name: MILDER, manufactured by: Pacific Machinery & Engineering Co., Ltd.) and a high-speed emulsifying and dispersing machine (product name: T.K. HOMOMIXER MARK II, manufactured by: PRIMIX Corporation).

As the polymerization initiator, examples include, but are not limited to, persulfates such as potassium persulfate and ammonium persulfate; azo compounds such as 4,4'-azobis(4-cyanovaleric acid), 2,2'-azobis(2-methyl-N-(2-hydroxyethyl)propion amide), 2,2'-azobis(2-amidinopropane)dihydrochloride, 2,2'-azobis(2,4-dimethylvaleronitrile) and 2,2'-azobisisobutyronitrile; and organic peroxides such as di-t-butyl peroxide, benzoyl peroxide, t-butylperoxy-2-ethylhexanoate, t-butylperoxy-2-ethylbutanoate, t-hexylperoxy-2-ethylbutanoate, diisopropyl peroxydicarbonate, di-t-butylperoxy isophthalate and t-butylperoxy isobutyrate. These polymerization initiators can be used alone or in combination of two or more kinds. Among them, the organic peroxides are preferably used since they can reduce residual polymerizable monomer and can impart excellent printing durability.

Among the organic peroxides, preferred are peroxy esters, and more preferred are non-aromatic peroxy esters, i.e. peroxy esters having no aromatic ring, since they have excellent initiator efficiency and can reduce a residual polymerizable monomer.

The polymerization initiator may be added after dispersing the polymerizable monomer composition to the aqueous medium and before forming droplets as described above, or may be added to the polymerizable monomer composition before the polymerizable monomer composition is dispersed in the aqueous medium.

The added amount of the polymerization initiator, which is used for polymerization of the polymerizable monomer composition, is preferably from 0.1 to 20 parts by mass, more preferably from 0.3 to 15 parts by mass, and further preferably from 1 to 10 parts by mass, with respect to 100 parts by mass of the monovinyl monomer.

In the present disclosure, the aqueous medium means a medium containing water as a main component.

In the present disclosure, the dispersion stabilizer is preferably added to the aqueous medium. As the dispersion stabilizer, examples include, but are not limited to, inorganic compounds including sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and iron(II) hydroxide; and organic compounds including water-soluble polymers such as polyvinyl alcohol, methyl cellulose and gelatin; anionic surfactants; nonionic surfactants; and ampholytic surfactants. These dispersion stabilizers can be used alone or in combination of two or more kinds.

Among the above dispersion stabilizers, colloid of inorganic compounds, particularly hardly water-soluble metal hydroxide, is preferable. The use of the colloid of inorganic compounds, particularly of hardly water-soluble metal hydroxide makes it possible to narrow a particle size distribution of the colored resin particles and reduce the amount of the dispersion stabilizer remaining after washing, thus the obtained polymerized-toner becomes capable of reproducing clear images, and moreover inhibiting deterioration of environmental stability.

(A-3) Polymerization Process

Formation of the droplets is carried out as described in the above (A-2). The thus-obtained aqueous dispersion medium is heated to polymerize, thereby forming an aqueous dispersion of colored resin particles containing the yellow colorant.

The polymerization temperature of the polymerizable monomer composition is preferably 50° C. or more, and more preferably from 60° C. to 95° C. The polymerization reaction time is preferably from 1 to 20 hours, and more preferably from 2 to 15 hours.

The colored resin particles may be used as they are as a polymerized toner, or they may be mixed with an external additive and used as a polymerized toner. It is preferable to make the so-called core-shell type (or "capsule type") colored resin particle by using the abovementioned colored resin particle as a core layer and forming a shell layer, which is different from the core layer, around the core layer. By covering the core layer composed of a substance having a low softening point with a substance having a higher softening point, the core-shell type colored resin particles can achieve a balance between lowering of fixing temperature and prevention of aggregation during storage.

A method for producing the above-mentioned core-shell type colored resin particles using the colored resin particles, is not particularly limited. The core-shell type colored resin particles can be produced by a conventional method. The in situ polymerization method and the phase separation method are preferable from the viewpoint of production efficiency.

Hereinafter, a method for producing the core-shell type colored resin particles by the in situ polymerization method, will be described.

A polymerizable monomer for forming a shell layer (a polymerizable monomer for shell) and a polymerization initiator are added to an aqueous medium in which the colored resin particles are dispersed, followed by polymerization, thereby the core-shell type colored resin particles can be obtained.

As the polymerizable monomer for shell, the above-mentioned polymerizable monomers can be used. Among the polymerizable monomers, any of monomers which provide a polymer having Tg of more than 80° C. such as styrene, acrylonitrile and methyl methacrylate is preferably used alone or in combination of two or more kinds.

As the polymerization initiator used for polymerization of the polymerizable monomer for shell, examples include, but are not limited to, water-soluble polymerization initiators including metal persulfates such as potassium persulfate and ammonium persulfate; and azo-type initiators such as 2,2'-azobis(2-methyl-N-(2-hydroxyethyl)propionamide) and 2,2'-azobis(2-methyl-N-(1,1-bis(hydroxymethyl)-2-hydroxyethyl)propionamide). These polymerization initiators can be used alone or in combination of two or more kinds. A content of the polymerization initiator is preferably from 0.1 to 30 parts by mass, more preferably from 1 to 20 parts by mass, with respect to 100 parts by mass of the polymerizable monomer for shell.

The polymerization temperature of the shell layer is preferably 50° C. or more, and more preferably from 60° C. to 95° C. The polymerization reaction time is preferably from 1 to 20 hours, and more preferably from 2 to 15 hours.

(A-4) Processes of Washing, Filtering, Dehydrating and Drying

It is preferable that the aqueous dispersion of the colored resin particles obtained by the polymerization is subjected to operations including filtering, washing for removing the dispersion stabilizer, dehydrating, and drying by several times as needed after the polymerization, according to any conventional method.

The washing is preferably carried out by the following method. When the inorganic compound is used as the dispersion stabilizer, acid or alkali is added to the aqueous dispersion of the colored resin particles, thereby dissolving the dispersion stabilizer in water and removing it. When the colloid of the hardly water-soluble inorganic hydroxide is used as the dispersion stabilizer, the pH of the aqueous dispersion of the colored resin particles is preferably controlled to 6.5 or less by adding acid. Examples of the acid to be added include inorganic acids such as sulfuric acid, hydrochloric acid and nitric acid, and organic acids such as formic acid and acetic acid. Particularly, sulfuric acid is suitable for high removal efficiency and small impact on production facilities.

The methods for dehydrating and filtering are not particularly limited, and any of various known methods can be used. For example, a centrifugal filtration method, a vacuum filtration method and a pressure filtration method can be used. Also, the drying method is not particularly limited, and any of various methods can be used.

(B) Pulverization Method

In the case of producing the colored resin particles by employing the pulverization method, the following processes are performed.

First, a binder resin, a yellow colorant, and other additives such as a charge control agent and a release agent etc., which are added if required, are mixed by means of a mixer such as a ball mill, a V type mixer, FM MIXER (: product name, manufactured by NIPPON COKE & ENGINEERING CO., LTD.), a high-speed dissolver, an internal mixer or a fallberg. Next, the above-obtained mixture is kneaded while heating by means of a press kneader, a twin screw kneading machine or a roller. The thus-obtained kneaded product is coarsely pulverized by a pulverizer such as a hammer mill, cutter mill, roller mill, etc. In addition, the resultant is finely pulverized by a pulverizer such as a jet mill, high-speed rotating pulverizer or the like and then classified into a desired particle diameter by a classifier such as a pneumatic classifier or airflow classifier, thus obtaining colored resin particles produced by the pulverization method.

Incidentally, the binder resin, the yellow colorant, and other additives such as the charge control agent and the release agent etc., which are added if required, used in the above-mentioned "(A) Suspension Polymerization Method" can be used in the pulverization method. Similarly, to the colored resin particles obtained by the above "(A) Suspension Polymerization Method", the colored resin particles obtained by the pulverization method can be core-shell type colored resin particles by a method such as the in situ polymerization method.

As the binder resin, other resins which are conventionally and broadly used for toners can be used. Specific examples of the binder resin used in the pulverization method include polystyrene, styrene-butyl acrylate copolymers, polyester resins and epoxy resins.

2. Colored Resin Particles

The colored resin particles containing the yellow colorant are obtained by the above production method such as "(A) Suspension Polymerization Method" or "(B) Pulverization Method."

Hereinafter, the colored resin particles constituting the toner will be described. The colored resin particles hereinafter include both core-shell type colored resin particles and colored resin particles which are not core-shell type.

The volume average particle diameter (Dv) of the colored resin particles is preferably from 3 to 15 μm, and more preferably from 4 to 12 μm. When the volume average particle diameter (Dv) is from 3 to 15 μm, a decrease of the flowability of the toner, a deterioration in transferability, a decrease in image density and a decrease in image resolution are not likely to occur.

As for the colored resin particles, a ratio (Dv/Dn) of the volume average particle diameter (Dv) and the number average particle diameter (Dn) is preferably from 1.0 to 1.3, more preferably from 1.0 to 1.2. When the ratio (Dv/Dn) is from 1.0 to 1.3, decreases in transferability, image density and resolution are not likely to occur. The volume average particle diameter and number average particle diameter of the colored resin particles can be measured by means of a particle size analyzer (product name: MULTISIZER, manufactured by: Beckman Coulter, Inc.), for example.

The average circularity of the colored resin particles of the present disclosure is preferably from 0.96 to 1.00, more preferably from 0.97 to 1.00, and further preferably from 0.98 to 1.00, from the viewpoint of image reproducibility.

When the average circularity of the colored resin particles is from 0.96 to 1.00, thin line reproducibility is excellent.

As the toner of the present disclosure, the colored resin particles containing the yellow colorant can be used as they are. From the viewpoint of controlling the chargeability, flowability and shelf stability of the toner, the colored resin particles may be used as a one-component toner by mixing the colored resin particles with an external additive to add the external additive on the surface of the colored resin particles.

The one-component toner may be mixed and stirred together with carrier particles to form a two-component toner.

The agitator for adding an external additive on colored resin particles is not particularly limited as long as it is an agitator capable of adding the external additive on the surface of the colored resin particles. As the agitator, examples include, but are not limited to, agitators capable of mixing and agitating such as FM MIXER (product name; manufactured by NIPPON COKE & ENGINEERING CO., LTD.), SUPER MIXER (product name; manufactured by KAWATA Manufacturing Co., Ltd.), Q MIXER (product name; manufactured by NIPPON COKE & ENGINEERING CO., LTD.), MECHANOFUSION SYSTEM (product name; manufactured by Hosokawa Micron Corporation) and MECHANOMILL (product name; manufactured by Okada Seiko Co., Ltd.)

As the external additive, examples include, but are not limited to, inorganic fine particles composed of silica, titanium oxide, aluminum oxide, zinc oxide, tin oxide, calcium carbonate, calcium phosphate and/or cerium oxide; and organic fine particles composed of polymethyl methacrylate resin, silicone resin and/or melamine resin. Among them, inorganic fine particles are preferred. Of inorganic fine particles, silica and/or titanium oxide is preferred, and fine particles composed of silica are particularly preferred.

These external additives can be used alone, but it is preferable to use them in combination of two or more kinds.

In the present disclosure, it is desirable that the external additive is used in an amount of, generally from 0.05 to 6 parts by mass, preferably from 0.2 to 5 parts by mass, with respect to 100 parts by mass of the colored resin particles. When the added amount of the external additive is from 0.05 to 6 parts by mass, a transfer residue is reduced and fog is not likely to occur.

4. Toner of the Present Disclosure

The toner of the present disclosure obtained through the above processes is a yellow toner which shows, even in small amounts, higher gloss, reflection density and chroma than ever before, and which has excellent in light resistance, since the compound A and/or the compound B are used in combination with the compound C as the yellow colorant.

EXAMPLES

Hereinafter, the present disclosure will be described further in detail with reference to examples and comparative examples. However, the present disclosure is not limited to these examples. Herein, parts and % are based on mass unless otherwise noted.

Test methods used in the examples and the comparative examples are as follows.

1. Production of Colored Resin Particles

<Colored Resin Particles (1)>

(1) Preparation of Polymerizable Monomer Composition for Core:

First, 75 parts of styrene and 25 parts of n-butyl acrylate, 0.1 parts of a polymethacrylic acid ester macromonomer (product name: AA6, manufactured by TOAGOSEI Co., Ltd., Tg=94° C.), 0.7 parts of divinylbenzene, 1.0 part of tetraethylthiuram disulfide, 8 parts of C.I. Pigment Yellow 155 (represented by the following formula (1A), CAS No. 68516-73-4, hue angle: 95°, product name: TONER YELLOW 3GP, manufactured by: Clariant Corp.) as the compound A, 4 parts of C.I. Solvent Yellow 179 (represented by the formula (3), CAS No. 54079-53-7, product name: SOLVAPERM YELLOW 6G, manufactured by: Clariant Corp.) as the compound C were wet-pulverized by means of a media-type disperser (product name: PICO MILL, manufactured by: Asada Iron Works Co., Ltd.). To a mixture obtained by the wet pulverizing, 0.75 parts of a charge control resin (product name: ACRYBASE FCA-161P, manufactured by: Fujikura Kasei Co., Ltd.) and 10 parts of a synthetic ester wax (pentaerythritoltetrastearate, melting point: 76° C.) were added, mixed and dissolved to obtain a polymerizable monomer composition.

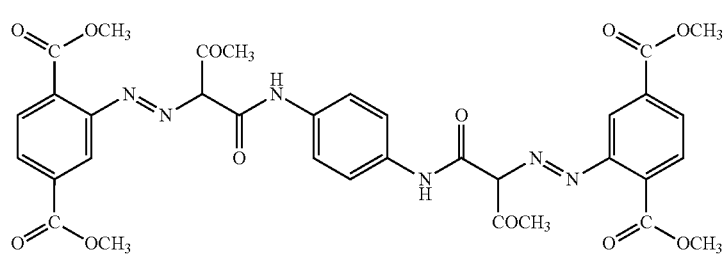

Formula (1A)

(2) Preparation of Aqueous Dispersion Medium:

On the other hand, an aqueous solution in which 7.3 parts of sodium hydroxide was dissolved in 50 parts of ion exchanged water was gradually added under stirring to an aqueous solution in which 10.4 parts of magnesium chloride was dissolved in 280 parts of ion exchanged water to prepare a magnesium hydroxide colloidal dispersion.

(3) Preparation of Polymerizable Monomer for Shell:

On the other hand, 2 parts of methyl methacrylate and 130 parts of water were finely dispersed by means of an ultrasonic emulsifier to prepare an aqueous dispersion of a polymerizable monomer for shell.

(4) Droplets Forming Process:

The polymerizable monomer composition was charged into the magnesium hydroxide colloidal dispersion (magnesium hydroxide colloid amount: 5.3 parts), and the mixture was further stirred, then 6 parts of t-butylperoxy-2-ethyl butanoate was added thereto as a polymerization initiator. The dispersion to which the polymerization initiator had been added was dispersed at a rotation number of 15,000 rpm by an in-line type emulsifying and dispersing machine (product name: MILDER, manufactured by Pacific Machinery & Engineering Co., Ltd) to form droplets of the polymerizable monomer composition.

(5) Suspension Polymerization Process:

A dispersion containing droplets of the polymerizable monomer composition was placed in a reactor, and the temperature was raised to 90° C. to perform a polymerization reaction. After the polymerization conversion rate reached almost 100%, a solution prepared by dissolving 0.1 parts of 2,2'-azobis[2-methyl-N-(2-hydroxyethyl)-propionamide] (product name: VA-086, manufactured by Wako Pure Chemical Industries, Ltd., water-soluble initiator) as a polymerization initiator for shell in the aqueous dispersion of the polymerizable monomer for shell was added to the reactor. Subsequently, polymerization was further continued by maintaining the temperature at 95° C. for 4 hours, and then the reaction was stopped by water cooling to obtain an aqueous dispersion of core-shell type colored resin particles.

(6) Post-Treatment Process:

While the aqueous dispersion of the colored resin particles was agitated, as acid washing, sulfuric acid was added thereto until the pH of the aqueous dispersion reached 4.5 or less (25° C., 10 minutes). Then, the colored resin particles separated by filtration were washed with water, and the wash water was filtered. The electric conductivity of the filtrate at this time was 20 μS/cm. Furthermore, the colored resin particles after the washing and filtration process were dehydrated and dried to obtain dried colored resin particles (1).

<Colored Resin Particles (2) to (9)>

Colored resin particles (2) to (9) were obtained in the same manner as the production method of the colored resin particles (1), except that in the "Preparation of Polymerizable Monomer Composition for Core", the type and added amount of the colorant were changed as shown in Table 1.

The details of the colorants shown in Table 1 are as follows.

PY214: C.I. Pigment Yellow 214 (the compound A, represented by the following formula (1B), CAS No. 254430-12-5, hue angle: 97°, product name: PV FAST YELLOW H9G VP2430, manufactured by: Clariant Corp.)

PY74: C.I. Pigment Yellow 74 (the compound B, represented by the following formula (2A), CAS No. 6358-31-2, hue angle: 93° to 91°, product name: FAST YELLOW 7413, manufactured by: SANYO COLOR WORKS, Ltd.)

PY93: C.I. Pigment Yellow 93 (the compound A, represented by the following formula (1C). CAS No. 5580-57-4, hue angle: 95°, product name: CROMOPHTAL YELLOW 3G, manufactured by: BASF Corp.)

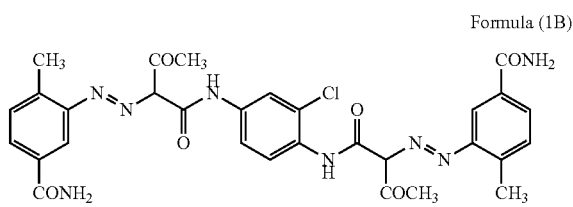

Formula (1B)

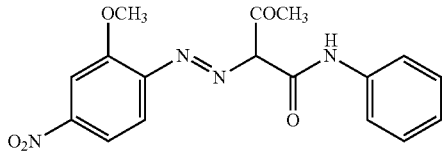

Formula (2A)

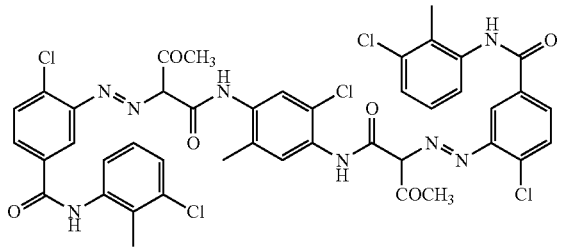

Formula (1C)

2. Evaluation of Properties of Colored Resin Particles

Measurement of volume average particle diameter (Dv) was carried out on the colored resin particles (1) to (9).

First, 0.1 g of a measurement sample (colored resin particles) was weighed out and put in a beaker. As a dispersant, 0.1 mL of surfactant aqueous solution (product name: DRIWEL, manufactured by: Fujifilm Corporation) was added thereto. In addition, 10 mL to 30 mL of ISOTON II was added to the beaker. The mixture was dispersed for three minutes with a 20 W ultrasonic disperser. Then, the volume average particle diameter (Dv) of the colored resin particles was measured with a particle diameter measuring device (product name: MULTISIZER, manufactured by: Beckman Coulter, Inc.) in the following conditions: aperture diameter: 100 μm, medium: ISOTON II, number of measured particles: 100,000.

3. Production of Yellow Toner

The colored resin particles (1) to (9) were subjected to an external addition treatment to produce yellow toners of Examples 1 to 6 and Comparative Examples 1 to 3.

Example 1

First, 0.6 parts of hydrophobized silica fine particles having an average particle diameter of 7 nm and 1 part of hydrophobized silica fine particles having an average particle diameter of 35 nm, were added to 100 parts of the colored resin particles (1). They were mixed by means of a high-speed mixer (product name: FM MIXER, manufactured by: Nippon Coke & Engineering Co., Ltd.) to prepare the yellow toner of Example 1.

Examples 2 to 6, Comparative Examples 1 to 3

The yellow toners of Examples 2 to 6 and Comparative Examples 1 to 3 were obtained in the same manner as Example 1, except that the colored resin particles (1) were changed to, as shown in the following Table 1, any of the colored resin particles (2) to (9).

4. Evaluation of Yellow Toner

Reflection density (image density) and chroma (C*) of the yellow toners of Examples 1 to 6 and Comparative Examples 1 to 3 were measured as follows. Also, the light resistance of the yellow toners was evaluated as follows.

(1) Measurement of Reflection Density and Chroma

A commercially-available, non-magnetic one-component development color printer (printing rate: 20 sheets/min) was used. The toner cartridge of the development device was filled with a sample yellow toner, and printing sheets were loaded in the printer. Then, the printer was left to stand under an (N/N) environment at a temperature of 23° C. and a relative humidity of 50% for one day. Then, while the amount of the toner supplied onto the developing roller in solid pattern printing was fixed at 0.3 mg/cm$^2$, sheets were continuously printed at an image density of 5% from the beginning of the printing. Solid pattern printing (image density: 100%) was carried out on the tenth sheet. Using a McBeth transmitting image densitometer, the reflection density (image density) and chroma (C*) of the tenth sheet were measured.

(2) Evaluation of Light Resistance

The light resistance of the toner was evaluated based on a reflection density decrease rate obtained from the value of the reflection density obtained in the above "(1). Measurement of Reflection Density and Chroma" and the value of the reflection density obtained after the printer was left to stand for a long period of time (560 hours).

The same color printer as above was used. The toner cartridge of the development device was filled with a sample yellow toner, and printing sheets were loaded in the printer. Then, the printer was left to stand under an (N/N) environment at a temperature of 23° C. and a relative humidity of 50% for 560 hours. Then, in the same condition, sheets were continuously printed, and solid pattern printing (image density: 100%) was carried out on the tenth sheet. Using a McBeth transmitting image densitometer, the reflection density (image density) of the tenth sheet was measured. A reflection density decrease rate was obtained by the following formula, using, as just described, the value (ID$_{560}$) of the reflection density (image density) obtained after the printer was left to stand for 560 hours, and the value (ID$_{ON}$) of the reflection density (image density) obtained in the above "(1) Measurement of Reflection Density and Chroma."

(Reflection density decrease rate)={(ID$_{ON}$−ID$_{560}$)/ID$_{ON}$}×100(%)

From the reflection density decrease rate thus obtained, the light resistance of the toner was evaluated in accordance with the following evaluation criteria.

A: The reflection density decrease rate is less than 8%.

F: The reflection density decrease rate is 8% or more.

Table 1 shows the measurement and evaluation results of the yellow toners of Examples 1 to 6 and Comparative Examples 1 to 3, along with the toner composition.

"A+B+C" in the following Table 1 means the total added amount of the compound A, the compound B and the compound C. "(compound A+compound B)/compound C" in the following Table 1 means a mass rate of the total content of the compound A and the compound B to the content of the compound C.

TABLE 1

|  |  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Colored resin particles |  | Particles (1) | Particles (2) | Particles (3) | Particles (4) | Particles (5) | Particles (6) | Particles (7) | Particles (8) | Particles (9) |
| Yellow colorant | Compound A | PY155 | PY155 | PY214 | — | PY93 | PY155 | PY155 | PY155 | PY155 |
|  | Added amount (parts) | 8 | 10 | 8 | — | 8 | 4 | 8 | 7 | 10 |
|  | Compound A | — | — | — | — | — | — | PY214 | PY214 | — |
|  | Added amount (parts) | — | — | — | — | — | — | 4 | 7 | — |
|  | Compound B | — | — | — | PY74 | — | PY74 | — | — | — |
|  | Added amount (parts) | — | — | — | 8 | — | 4 | — | — | — |
|  | Compound C | SY179 | SY179 | SY179 | SY179 | SY179 | SY179 | — | — | — |
|  | Added amount (parts) | 4 | 2 | 4 | 4 | 4 | 4 | — | — | — |
|  | A + B + C (parts) | 12 | 12 | 12 | 12 | 12 | 12 | 12 | 14 | 10 |
|  | (A + B)/C | 2.0 | 5.0 | 2.0 | 2.0 | 2.0 | 2.0 | — | — | — |
| Volume average particle diameter Dv (μm) |  | 5.8 | 5.8 | 5.8 | 7.4 | 8.7 | 6.7 | 6.5 | 6.3 | 5.0 |
| Printing evaluation | Amount of toner on the sheet (mg/cm$^2$) | 0.3 | 0.3 | 0.3 | 0.3 | 0.3 | 0.3 | 0.3 | 0.3 | 0.3 |
|  | Reflection density | 1.36 | 1.39 | 1.33 | 1.33 | 1.30 | 1.34 | 1.25 | 1.33 | 1.24 |
|  | Chroma C* | 84.2 | 85.5 | 82.0 | 88.0 | 83.5 | 85.8 | 81.5 | 83.5 | 80.7 |
|  | Gloss | 7.1 | 7.0 | 6.7 | 7.1 | 6.9 | 7.0 | 6.0 | 6.5 | 7.0 |
| Evaluation of light resistance |  | A | A | A | A | A | A | A | A | A |

5. Summary of Toner Evaluation

The yellow toners of Comparative Examples 1 to 3 are toners in which, the compound A is used alone as the yellow colorant. Of these yellow toners, the yellow toners of Comparative Examples 1 and 2 contain C.I. Pigment Yellow 155 and C.I. Pigment Yellow 214, that is, the toners contain two kinds of the compound A in combination.

For Comparative Example 1, the reflection density is as low as 1.25, the chroma C* is as low as 81.5, the gloss is as low as 6.0. In contrast, the results of Comparative Example 2 (reflection density: 1.33, chroma C*: 83.5, gloss: 6.5) is better in printing evaluation than Comparative Example 1, since the total added amount of the colorant of Comparative Example 2 is larger than that of Comparative Example 1. However, even for Comparative Example 2, the value of the gloss is still low.

Accordingly, it is found that the yellow toner is especially poor in gloss, when the combination of yellow pigments is contained in the toner and the amount of the toner on the sheet is 0.3 mg/cm² which is smaller than ever before.

The yellow toner of Comparative Example 3 is a toner in which, only one kind of compound A is contained as the yellow colorant.

For Comparative Example 3, the reflection density is as low as 1.24, the chroma C* is as low as 80.7. Accordingly, it is found that the yellow toner is poor in reflection density and dull in color, when only one kind of compound A is contained as the yellow colorant in the toner and the amount of the toner on the sheet is 0.3 mg/cm² which is smaller than ever before.

On the other hand, the yellow toners of Examples 1 to 6 are toners in which, at least one of the compound A and the compound B, and the compound C are contained as the yellow colorant.

For any of Examples 1 to 6, the reflection density is as high as 1.30 or more, the chroma C* is as high as 82.0 or more, the gloss is as high as 6.7 or more, and the light resistance evaluation result is "A."

Accordingly, it is found that the yellow toners of Examples 1 to 6, in which at least one of the compound A and the compound B, and the compound C are contained, show higher gloss, reflection density and chroma than ever before even when the amount of the toner on the sheet is 0.3 mg/cm² which is smaller than ever before.

The invention claimed is:

1. A yellow toner comprising a binder resin and a yellow colorant,
   wherein, as the yellow colorant, at least one of the compound A represented by the following general formula (1) and the compound B represented by the following general formula (2), and the compound C represented by the following formula (3) are contained:

General Formula (1)

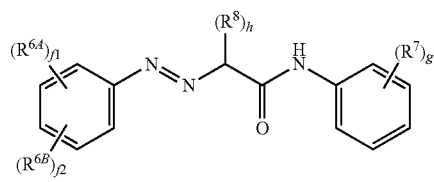

where $R^{1A}$, $R^{1B}$, $R^{2A}$ and $r^{2B}$ are each independently a halogen atom, an alkyl group, an alkoxy group, an amino group, a nitro group, an acetylamide group (—NHCOCH₃), a methyl ester group (—COOCH₃), a primary amide group (—CONH₂) or an arylamide group (—CONHAr); $R^{3A}$ and $R^{3B}$ are each independently a halogen atom or an alkyl group; $R^4$ and $R^5$ are each independently a halogen atom, an alkyl group, a methoxy group, an amino group, a nitro group, an acetylamide group (—NHCOCH₃), an acetyl group (—COCH₃), a methyl ester group (—COOCH₃) or a primary amide group (—CONH₂); a1 and b1 are non-negative integers that a sum of the non-negative integers a1 and b1 is 1 or more and 3 or less; a2 and b2 are non-negative integers that a sum of the non-negative integers a2 and b2 is 1 or more and 3 or less; c1 and c2 are non-negative integers that a sum of the non-negative integers c1 and c2 is 0 or more and 3 or less; d and e are each independently 1 or 2; Ar is an aryl group having 6 to 10 carbon atoms, which may have a substituent, General Formula (2)

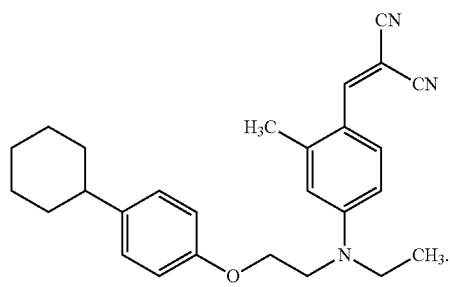

where $R^{6A}$ and $R^{6B}$ are each independently a halogen atom, an alkyl group, an alkoxy group, an amino group, a nitro group, an acetylamide group (—NHCOCH₃), a methyl ester group (—COOCH₃), a primary amide group (—CONH₂) or an arylamide group (—CONHAr); $R^7$ and $R^8$ are each independently a halogen atom, an alkyl group, a methoxy group, an amino group, a nitro group, an acetylamide group (—NHCOCH₃), an acetyl group (—COCH₃), a methyl ester group (—COOCH₃) or a primary amide group (—CONH₂); f1 and f2 are non-negative integers that a sum of the non-negative integers f1 and f2 is 1 or more and 3 or less; g is an integer of 0 or more and 3 or less; h is 1 or 2; Ar is an aryl group having 6 to 10 carbon atoms, which may have a substituent and Formula (3)

2. The yellow toner according to claim 1, wherein the compound A and the compound B are each a yellow pigment, and the compound C is a yellow dye.

3. The yellow toner according to claim 1, wherein a total content of the compound A and the compound B is from 1 part by mass to 15 parts by mass, and a content of the compound C is from 0.1 parts by mass to 8.0 parts by mass, with respect to 100 parts by mass of the binder resin.

4. The yellow toner according to claim 1, wherein a mass ratio of a total content of the compound A and the compound B to a content of the compound C ((compound A+compound B)/compound C) is from 0.1 to 10.

* * * * *